US010876334B2

(12) United States Patent
Santiago et al.

(10) Patent No.: US 10,876,334 B2
(45) Date of Patent: Dec. 29, 2020

(54) SYSTEM AND METHOD FOR REPLACING INTERIOR DOORS

(71) Applicant: JELD-WEN, Inc., Charlotte, NC (US)

(72) Inventors: Rafael Santiago, Klamath Falls, OR (US); Joel Chartier, Klamath Falls, OR (US); Derek Keen, Klamath Falls, OR (US)

(73) Assignee: JELD-WEN, INC, Charlotte, NC (US)

( * ) Notice: Subject to any disclaimer, the term of this patent is extended or adjusted under 35 U.S.C. 154(b) by 0 days.

(21) Appl. No.: 16/578,071

(22) Filed: Sep. 20, 2019

(65) Prior Publication Data

US 2020/0095813 A1 Mar. 26, 2020

Related U.S. Application Data

(60) Provisional application No. 62/734,921, filed on Sep. 21, 2018.

(51) Int. Cl.

*G01B 3/14* (2006.01)
*E05D 11/00* (2006.01)
*E04G 23/02* (2006.01)

(52) U.S. Cl.

CPC ...... *E05D 11/0009* (2013.01); *E04G 23/0277* (2013.01); *E05Y 2900/132* (2013.01)

(58) Field of Classification Search

CPC ...................... E05D 11/0009; E04G 23/02277
USPC .......................................... 33/194, 197, 562
See application file for complete search history.

(56) References Cited

U.S. PATENT DOCUMENTS

| | | | | |
|---|---|---|---|---|
| 3,519,043 A | | 7/1970 | Guill | |
| 4,430,830 A | | 2/1984 | Sailor | |
| 4,479,523 A | * | 10/1984 | Peterson | B27F 1/12 144/144.51 |
| 4,586,262 A | | 5/1986 | Back | |
| 4,787,432 A | * | 11/1988 | Williams | B23Q 9/0042 144/144.1 |
| 4,986,034 A | | 1/1991 | Mozuras et al. | |
| 5,042,543 A | * | 8/1991 | Carey | B23Q 9/0042 144/144.51 |
| 5,174,703 A | | 12/1992 | White | |
| 5,762,115 A | | 6/1998 | Shouse | |
| 6,308,476 B1 | | 10/2001 | Nakamoto et al. | |

(Continued)

FOREIGN PATENT DOCUMENTS

WO 198808479 A1 11/1988

OTHER PUBLICATIONS

Lowe's, Install or Replace Interior Doors, https://www.lowes.com/n/how-to/install-an-interior-door?cm_mmc=search_google-_-Millwork-_-Dsa_mlw_128_, last visited on Oct. 21, 2019, 13 pages.

(Continued)

*Primary Examiner* — George B Bennett
(74) *Attorney, Agent, or Firm* — Stoel Rives LLP

(57) ABSTRACT

The disclosure relates to a system and method for replacing an existing door while using the existing door frame structure. The system includes a mounting tool designed to locate a position of a door hinge on an existing door, and indicate a corresponding position for the door hinge on the replacement door without requiring substantial measurements or formation of hinge mortises. An edge mounting strip may be secured to the replacement door to complete the assembly and provide a flush surface with the door hinges along the end of the replacement door.

20 Claims, 6 Drawing Sheets

(56) References Cited

U.S. PATENT DOCUMENTS

| | | | | |
|---|---|---|---|---|
| 6,389,644 | B1 | 5/2002 | Russo | |
| 7,003,889 | B1 * | 2/2006 | Luciani | B27F 5/12 33/194 |
| D519,337 | S * | 4/2006 | Thomas | E04F 21/003 D8/14 |
| 7,421,791 | B2 * | 9/2008 | Adkins | B23B 47/287 33/197 |
| 7,543,388 | B2 * | 6/2009 | Christensen | E04F 21/003 33/194 |
| D716,120 | S * | 10/2014 | McMorris | E04F 21/003 D8/14 |
| 9,181,739 | B2 | 11/2015 | Baer | |
| 9,194,170 | B2 | 11/2015 | Eis et al. | |
| D803,019 | S * | 11/2017 | Ploeger | E04F 21/003 D8/19 |
| 10,487,519 | B2 * | 11/2019 | Ward | E04F 21/003 |
| 2004/0031204 | A1 | 2/2004 | Thompson | |
| 2005/0210690 | A1 * | 9/2005 | Morton | E05B 17/06 33/194 |
| 2006/0272166 | A1 | 12/2006 | Adkins et al. | |
| 2007/0227016 | A1 * | 10/2007 | Tarter | E05B 17/06 33/194 |
| 2010/0095597 | A1 * | 4/2010 | Zounis, Jr. | E05D 11/0009 49/383 |
| 2010/0287857 | A1 | 11/2010 | Kerr | |
| 2011/0185583 | A1 * | 8/2011 | Hardee | E04F 21/00 33/194 |
| 2012/0017452 | A1 * | 1/2012 | Lam | B23B 47/287 33/194 |
| 2013/0086788 | A1 * | 4/2013 | Sanchez | G01B 3/00 29/407.09 |

OTHER PUBLICATIONS

International Search Report and Written Opinion for International Application No. PCT/US2019/052283, dated Nov. 22, 2019, 7 pages.

* cited by examiner

SYSTEM AND METHOD FOR REPLACING INTERIOR DOORS

RELATED APPLICATIONS DATA

This application is a nonprovisional of and claims the benefit under 35 U.S.C. § 119(e) of U.S. Patent Application No. 62/734,921, filed Sep. 21, 2018, the disclosure of which is incorporated by reference herein in its entirety.

TECHNICAL FIELD

The field of the disclosure relates generally to doors, and in particular, to systems and methods for quickly replacing doors in an existing door jamb while requiring minimal labor and skill.

BACKGROUND

In residential and commercial buildings, interior doors installed in door frames may require replacement from time to time for various reasons. For example, a door may become damaged or worn over time, or the door may be replaced with a door having a different aesthetic or design, or the door may be replaced with another having an improved safety rating. In a typical replacement process, the existing door is removed by decoupling the door from the door hinges that secure the door to the door jamb. To facilitate installation of the replacement door, the door hinges may also be removed from the door jamb, and reused with the new replacement door or replaced with new door hinges as desired.

Typically, the replacement door is a slab or blank door that does not include preformed hinge mortises for receiving the door hinges along the sides of the door panel. Accordingly, in a conventional mounting process, hinge mortises are formed on the replacement doors at appropriate positions to match the existing mortises formed on the door jamb for the previous door. One challenge during this installation process is that the hinge mortises for the replacement door must be positioned to precisely match the corresponding position of the existing hinge mortises on the door jamb. A failure to properly align these features will result in the door not fitting properly within the door jamb or may result in an aesthetically unappealing door.

Accordingly, in a conventional installation process, a substantial amount of care is required to identify the location and precisely form the hinge mortises on the replacement door to ensure easy installation of the replacement door within the existing door frame. This process is not only time-consuming, as it involves extensive manual labor and precision to ensure the proper positioning of the hinge mortises on the replacement door, but it also requires a highly skilled worker using specialty tools to properly complete the process. For these reasons, these installation processes tend to be rather expensive.

Another potential option for replacing the damaged or worn door is to use a pre-hung door. Pre-hung doors are self-contained units that include a door slab, hinges, and an outer frame preassembled and ready for simple installation. While pre-hung doors may be easier to install in certain instances, one disadvantage of using a pre-hung door is that removal of the existing door frame structure is required, which may ultimately lead to higher overall costs depending on the required labor for removing the door frame and installing the pre-hung door. In addition, removing a door frame that is in fine working condition may create unnecessary waste since the existing door frame requires removal simply to replace the door. Moreover, once the pre-hung door is installed, there may be additional work involved to ensure that the trim around the pre-hung door matches or coordinates well with the surrounding trim in the room.

Accordingly, the present inventors have identified a need for an improved system and method of replacing interior doors to streamline the process and minimize the skill required to complete the task. In addition, the present inventors have identified a need for such an improved installation method that is easily repeatable and effective for replacing doors with minimal effort and without requiring replacement of door frame or jambs. Additional aspects and advantages will be apparent from the following detailed description of example embodiments, which proceeds with reference to the accompanying drawings.

DETAILED DESCRIPTION OF EXAMPLE EMBODIMENTS

Figure 1:
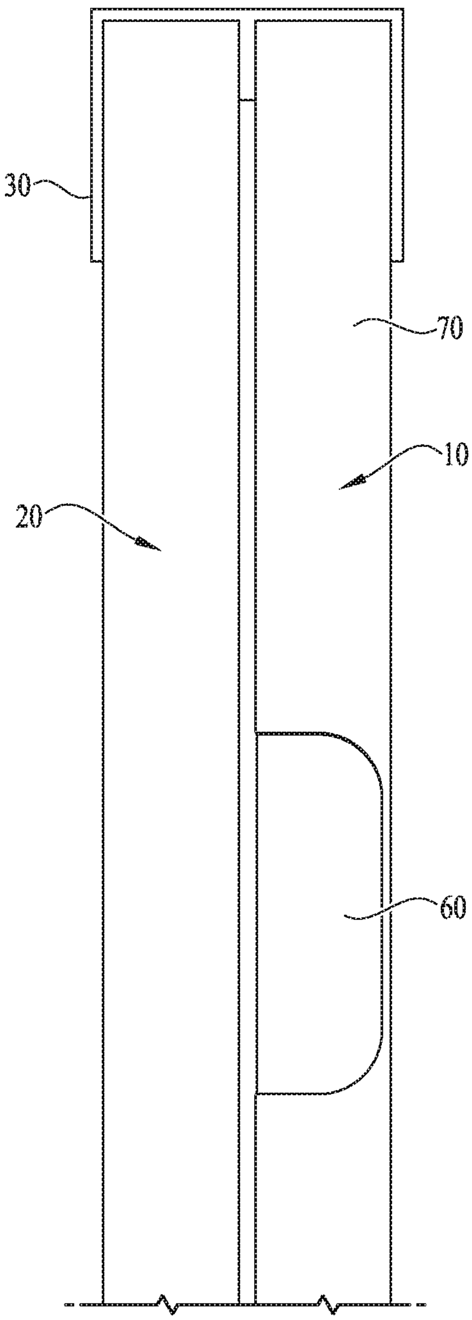
FIGS. 1 and 2 are views illustrating a replacement door positioned next to an original door for replacement in accordance with one embodiment.

With reference to the drawings, this section describes particular embodiments of a replacement door system and its detailed construction and operation. Throughout the specification, reference to "one embodiment," "an embodiment," or "some embodiments" means that a particular described feature, structure, or characteristic may be included in at least one embodiment of the safety system. Thus appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

Before turning to the figures, the following passage provides a brief background of conventional interior door assemblies to help establish a frame of reference for the written description. In one conventional embodiment, an interior door assembly includes a door frame with a pair of vertically-extending door jambs and a horizontal head jamb extending across. One of the door jambs typically includes two or three spaced-apart, shallow notches or mortises formed thereon, where each mortise is designed to receive a door hinge leaf. Similarly, the door that is to be fitted in the door jamb also has corresponding mortises formed along an edge thereof, where each mortise receive a corresponding door hinge leaf to attach the door to the door jamb and accommodate the swinging action of the door.

In a conventional door replacement process, the original door is removed from the door jamb and a precise positioning of the mortises on the original door is measured. Once those measurements are obtained, corresponding mortises on the replacement door are formed (e.g., using a router or other tool) at the same precise location and at the same width and depth as the mortises on the original door to ensure that the door hinges are properly received and that the replacement door will fit in the existing door jamb. While the overall process seems fairly straightforward, the precision required for measuring three different locations on the door demands significant time and attention to detail, and the specialty tools and skills involved in forming the mortises require skilled workers to ensure that the mortises are properly routed. If any measurement is inaccurate, or if the mortises are not precisely routed to match the original profile, depth and width, the replacement door may not fit properly in the door jamb (e.g., the door hinges may not align with the mortises on the door jamb), thereby potentially leading to performance issues and/or requiring replacement of the entire door frame. The following description relates to an improved system for replacing worn or damaged original doors that avoids many of the issues with such conventional replacement methods.

FIGS. 1-11 collectively illustrate embodiments of a system designed for easily and quickly replacing a worn or damaged interior door 10 without requiring measurement and formation of new hinge mortises on the replacement door 20. In addition, the improved replacement door system uses the existing door jamb (not shown), thereby minimizing cost and labor for completing the overall installation process. As further described in detail below, to ensure that the replacement door 20 will fit properly with the corresponding hinge mortises (not shown) already formed on the existing door jamb, the position of the door hinge 200 (see FIG. 8) on the replacement door 20 must match the corresponding position of the door hinges (not shown) on the original door 10 to be replaced. To simplify this process, the replacement door system described herein includes a mounting tool 80 designed to locate a position of the existing hinge mortise 60 formed on the original door 10, and quickly indicate a corresponding location on the replacement door 20 for affixing the door hinge 200. As further illustrated below, the mounting tool 80 radically simplifies the mounting process and avoids any need for precise measurement and formation of hinge mortises on the replacement door 20.

Once the door hinge locations are determined, the door hinges 200 are installed directly on the replacement door 20 without need to create mortises on the replacement door 20. Since the door hinges 200 are affixed to the replacement door 20 directly without mortises, the door hinges 200 may be slightly raised relative to the side surface of the replacement door 20 after installation. To create a flush finish along the side surface of the replacement door 20, an edge mounting strip 240 (see FIG. 9) made of a wood, wood composite, or other suitable material having a thickness substantially equal to the thickness of the door hinge 200, is affixed along the edge of the replacement door 20. As illustrated, the edge mounting strip 240 includes a cutout region 250 (which may be pre-cut depending on the material of choice) designed to be positioned around the door hinge 200. In this configuration, once the replacement door 20 is mounted to the door jamb, the door fits properly within the door jamb with no problematic gaps or spaces along the edge.

As further illustrated below, the improved replacement system provides a variety of advantages over the conventional installation process. For example, the improved system allows installation of a replacement door without removing existing casing or reframing the door. In addition, it significantly reduces the number of steps involved in installing a replacement door and eliminates the need to position, align, and route hinge slots/mortises, thereby reducing the time required to replace a door by as much as 50%. Moreover, the process is simplified such that homeowners may replace doors with minimal effort and skill, thereby resulting in overall cost-savings. Additional details of these and other embodiments relating to the replacement door system and its components are described in further detail below with reference to the figures.

The following begins with a brief comparison of typical features of an original door 10 and a replacement door 20 to establish a frame of reference, followed by a detailed description of specific features and characteristics of a mounting tool 80 and its use in the door replacement process.

Figure 2:
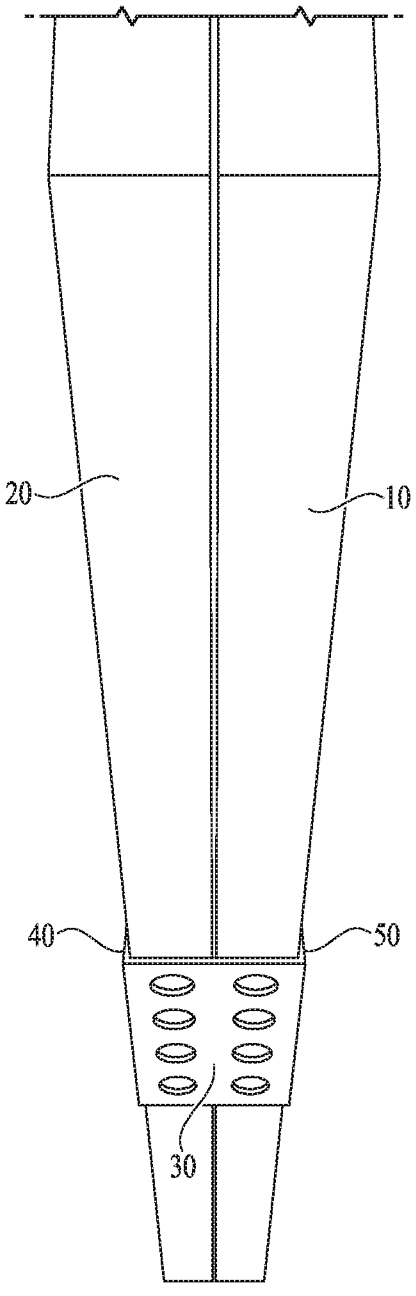

FIGS. 1 and 2 collectively illustrate views of a worn, original door 10 and a new, replacement door 20 arranged in a side-by-side configuration. In some embodiments, the replacement door 20 has a similar height to the original door 10, but may be slightly narrower in width to accommodate receiving the door hinge 200 without requiring the formation of a hinge mortise. Additional details relating to these features are described below with particular reference to FIGS. 9 and 10.

Returning to FIGS. 1 and 2, the doors 10, 20 may be held together via a separator device 30 (see FIG. 2) that includes a central divider positioned between the doors 10, 20 to slightly separate the doors 10, 20 from one another. The separator device 30 further includes a pair of opposing lateral walls 40, 50 design to abut against the outside surfaces of the respective doors 10, 20 to stabilize the doors 10, 20 and secure their respective position. The separator device 30 may be made from any suitable material, such as silicone rubber, plastic, or other material. Preferably, the separator device 30 is made of a suitable material so as to avoid marking the replacement door 20 during use.

With particular reference to FIG. 1, the original door 10 includes a mortise 60 formed along a side edge 70 of the door 10, the mortise 60 designed with an appropriate width and depth for receiving a leaf of a door hinge 200 (see FIG. 11) to couple the original door 10 to a door jamb (not shown). In some embodiments, the mortise 60 extends from one edge of the door 10 toward the opposing edge of the door in a general D-shaped configuration as illustrated in FIG. 1. Typically, the door 10 includes two or three mortises 60 formed along the edge 70, one for each of the door hinges used to couple the door 10 to the door jamb. The D-shaped mortise 60 is intended to illustrate an example embodiment of one conventional mortise 60 for a similarly-shaped door hinge. However, it should be understood that the principles of the subject matter disclosed herein may apply equally to other embodiments that include differently shaped mortises and door hinges.

Figure 8:
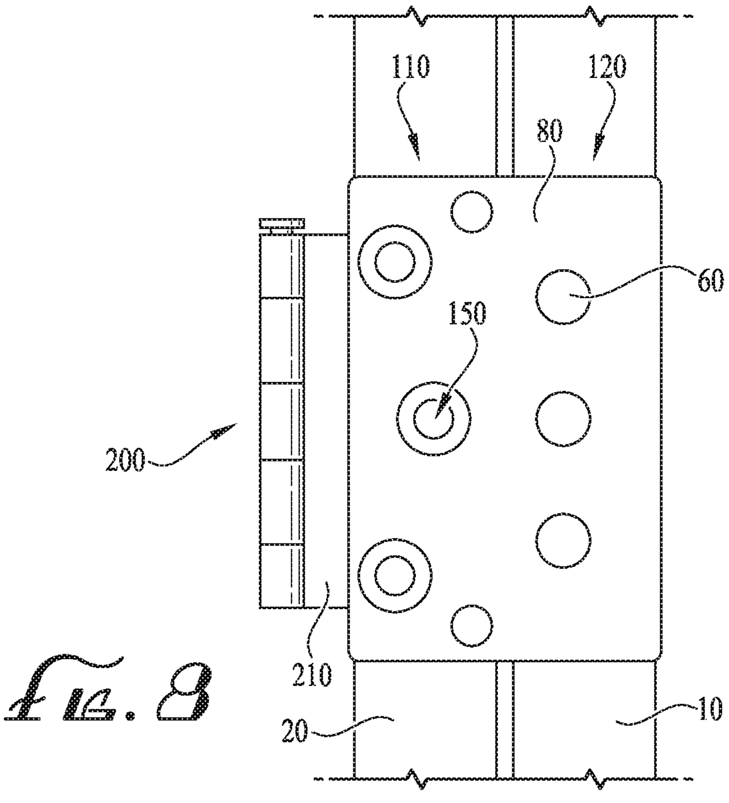

FIGS. 3-6 collectively illustrate an embodiment of a mounting tool 80 designed for locating a position of the mortise 60 on the original door 10 and quickly indicating a corresponding position on the replacement door 20 for the door hinge 200 (see FIG. 8). The mounting tool 80 may be made from any one of a variety of suitable materials, including soft, flexible materials and firm/rigid materials. For example, in one embodiment, the mounting tool 80 may be made from a plastic, metal, wood, or other suitable firm material. In other embodiments, the mounting tool 80 may be made from a semi-rigid silicone rubber material that provides some flexibility to help simplify mounting the tool 80 to the doors 10, 20. In still other embodiments, the mounting tool 80 may be made from any other suitable material.

Figure 3:
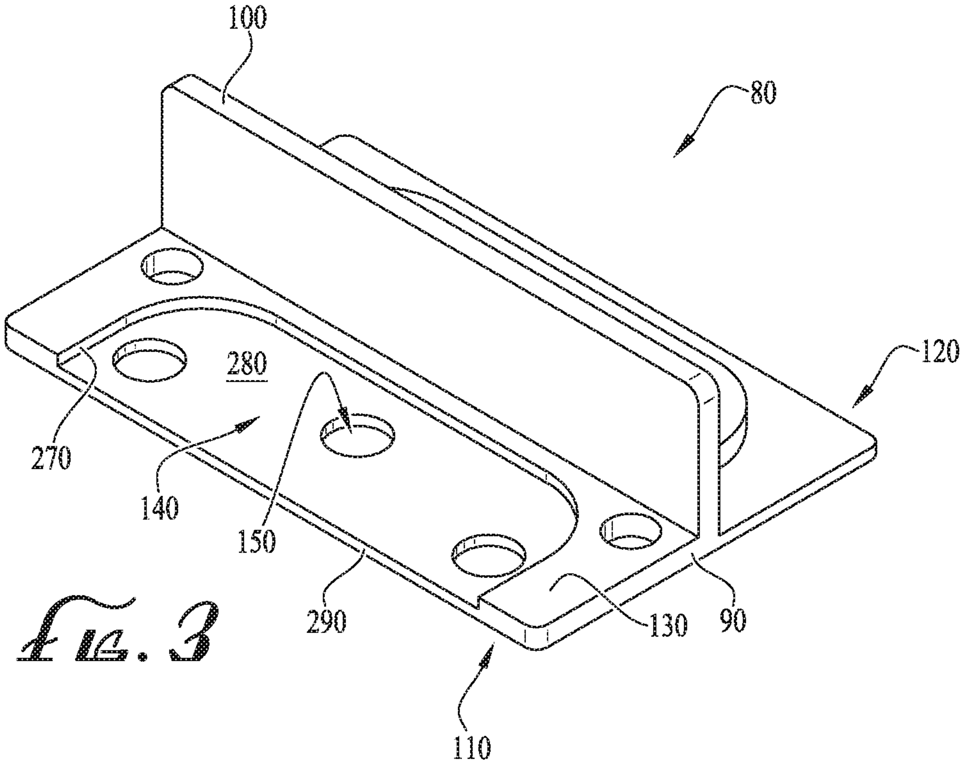
FIGS. 3-6 collectively illustrate various views of an example embodiment of a mounting tool used for locating a position of a door hinge during the door replacement process.
Figure 6:
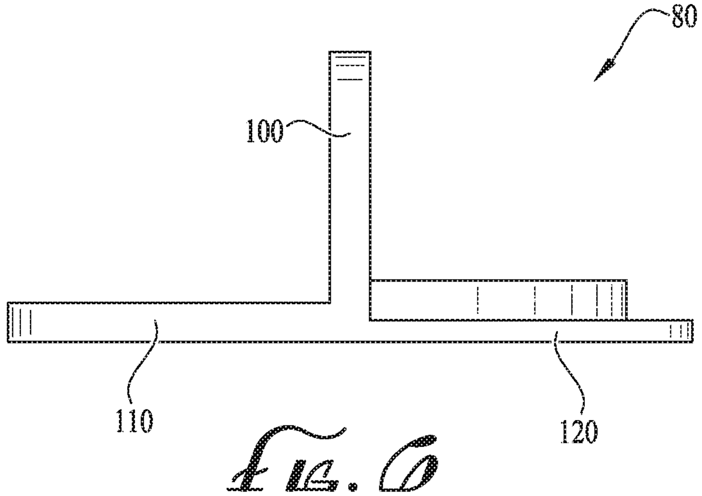

With particular reference to FIG. 3, the mounting tool 80 is a generally T-shaped structure including a base 90 and a dividing wall 100 extending upwardly from the base 90 in a generally perpendicular configuration (see also FIG. 6). The dividing wall 100 is generally centered on the base 90 between peripheral side surfaces 290, 320, the dividing wall 100 separating the base 90 into a first portion 110 and a second portion 120 (see FIG. 4) of roughly equal length and width dimensions.

The first portion 110 of the mounting tool 80 includes a substantially planar top surface 130 and a region 140 that is recessed downwardly and away from the top surface 130 (i.e., toward the opposite bottom surface 260 of the mounting tool 80). In some embodiments, the recessed region 140 is positioned on the top surface 130 such that it is offset from the dividing wall 100. In other words, a portion of the top surface 130 separates the recessed region 140 from the dividing wall 100 as illustrated in FIG. 3.

Figure 10:
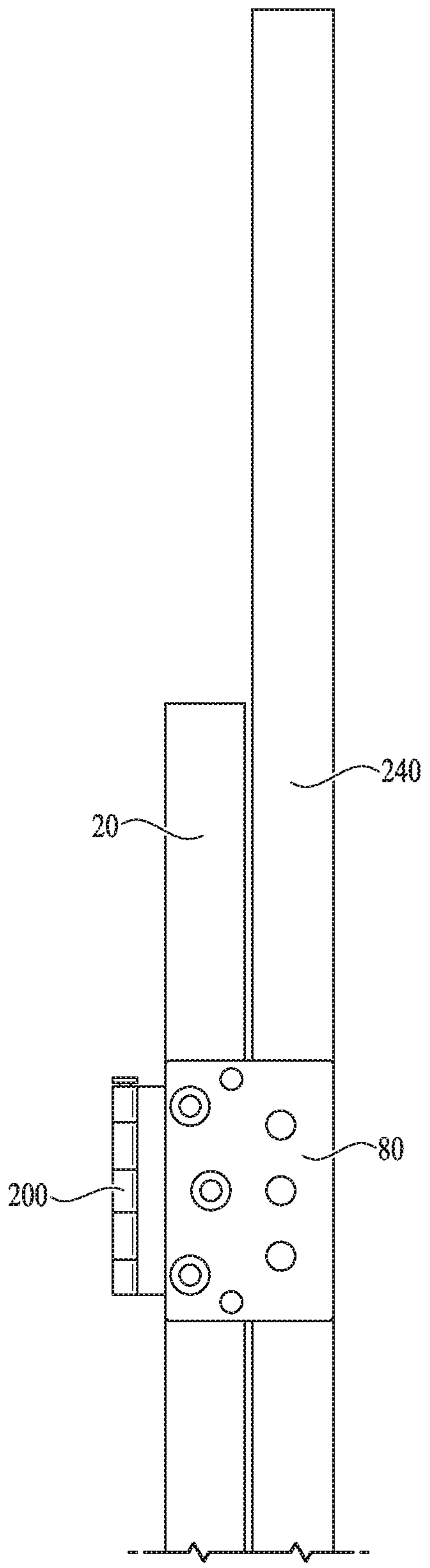
Figure 11:
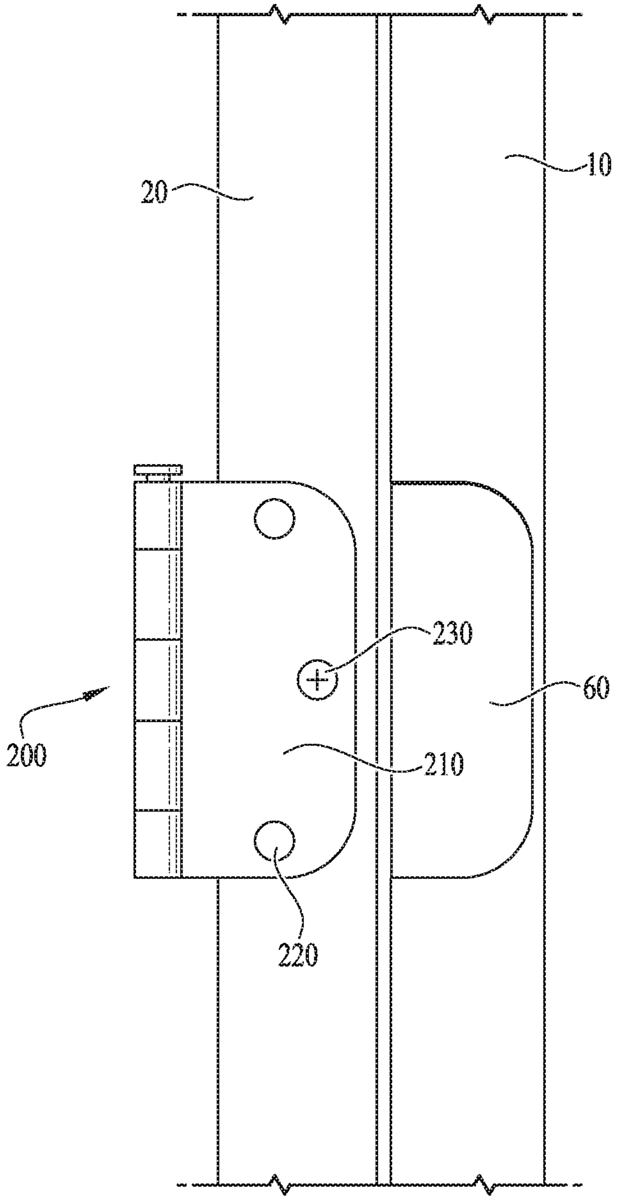
FIG. 11 illustrates a completed replacement door with mounted hinges and edge strip in accordance with one embodiment.

In one embodiment, the recessed region 140 has a profile that is a substantially D-shaped region designed to match a contour of a standard door hinge leaf (e.g., hinge leaf 210 in FIG. 11). For example, with reference to FIG. 3, the recessed region 140 includes an exterior wall 270 extending upwardly from a floor 280 to the top surface 130 of the mounting tool 80. The exterior wall 270 includes a profile with curvature that matches a standard D-shaped door hinge leaf as noted such that the hinge leaf may be received and seated flush within the recessed region 140 during the replacement process as further described below. As illustrated in FIG. 3, the recessed region 140 extends to the peripheral side surface 290 of the mounting tool 80 such that the floor 280 opens onto and is orthogonal with the peripheral side surface 290. It should be understood that in other embodiments, the recessed region 140 may have different profile configurations designed to match other configurations of the door hinge leaf as needed. For example, for a rectangular hinge leaf, the exterior wall 270 would have a corresponding rectangular shape to properly receive the hinge leaf during the replacement process. With reference to FIG. 3, the recessed region 140 includes a plurality of openings 150 extending from the floor 280 to the bottom surface 260 of the mounting tool 80, the openings 150 providing guiding points for inserting fasteners 230 therethrough (see FIG. 11) to attach the door hinge 200 to the replacement door 20 as further described in detail below with reference to FIGS. 8-11.

Figure 4:
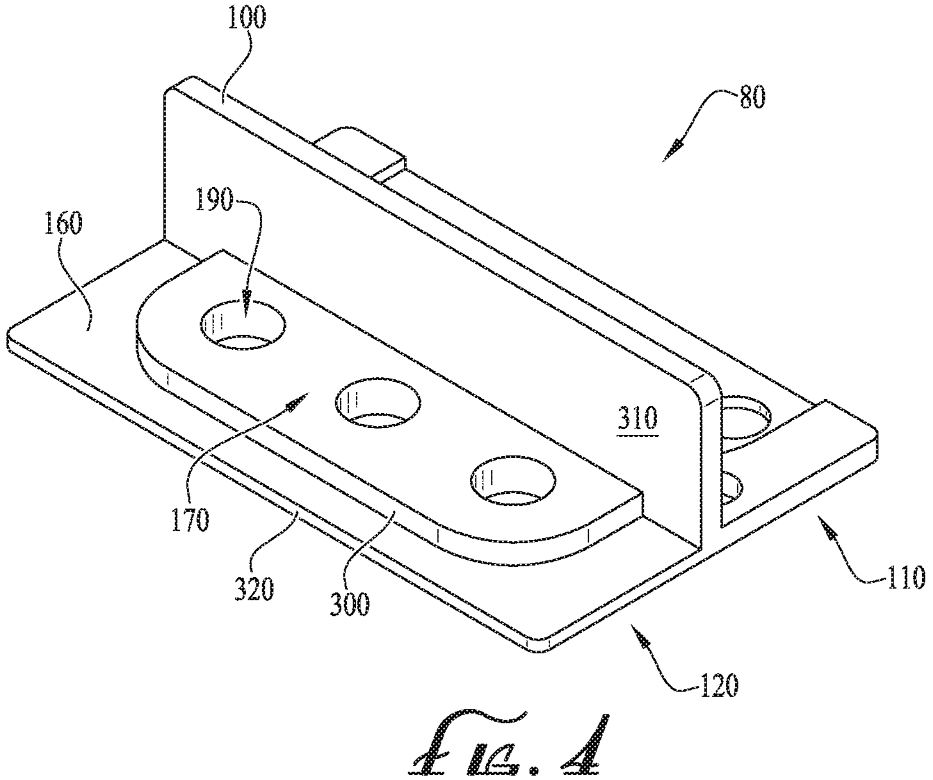
Figure 5:
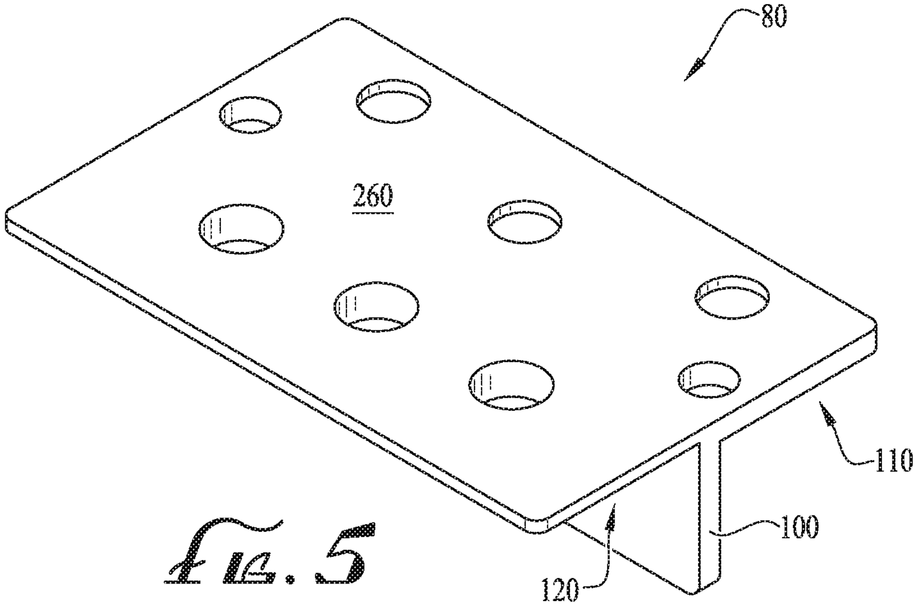

Turning to FIG. 4, the second portion 120 of the mounting tool 80 includes a substantially planar top surface 160 and a raised region 170 extending upwardly from the top surface 160 of the second portion 120. The raised region 170 has a profile that is a substantially D-shaped region matching the contour of a standard door hinge leaf, and that also matches the size and dimension of the first profile of the recessed region 140 (in the case of a standard door hinge with two D-shaped leaves). For example, with reference to FIG. 4, the raised region 170 includes an exterior wall 300 extending upwardly from the top surface 160 of the mounting tool 80. The exterior wall 300 includes a profile with curvature that matches a standard D-shaped door hinge leaf as noted such that the raised region 170 may be seated within the existing mortise 60 on the worn door 10 during the replacement process as further described below. As illustrated in FIG. 4, the exterior wall 300 is adjacent to and abuts a side surface 310 of the dividing wall 100 along a bottom portion thereof, with the exterior wall 300 being offset from the peripheral side surface 320 of the mounting tool 80. The raised region 170 also includes a plurality of openings 190 extending through the second portion 120 of the mounting tool 80, the openings 190 providing a guide for positioning the mounting tool 80 as further explained in detail with reference to FIGS. 7-8.

As noted above, the profiles of the recessed region 140 and the raised region 170 are designed such that they correspond with one another. In other words, the profile of the exterior wall 270 matches that of the exterior wall 300 such that the curved portions of the respective walls have the same radius of curvature for the illustrated embodiment. Further, the depth of the recessed region 140 also preferably matches the height of the raised region 170 and the width/length of the respective regions 140, 170 is also the same. It should be understood that the same principles apply for door hinge leafs having different configurations.

Figure 7:
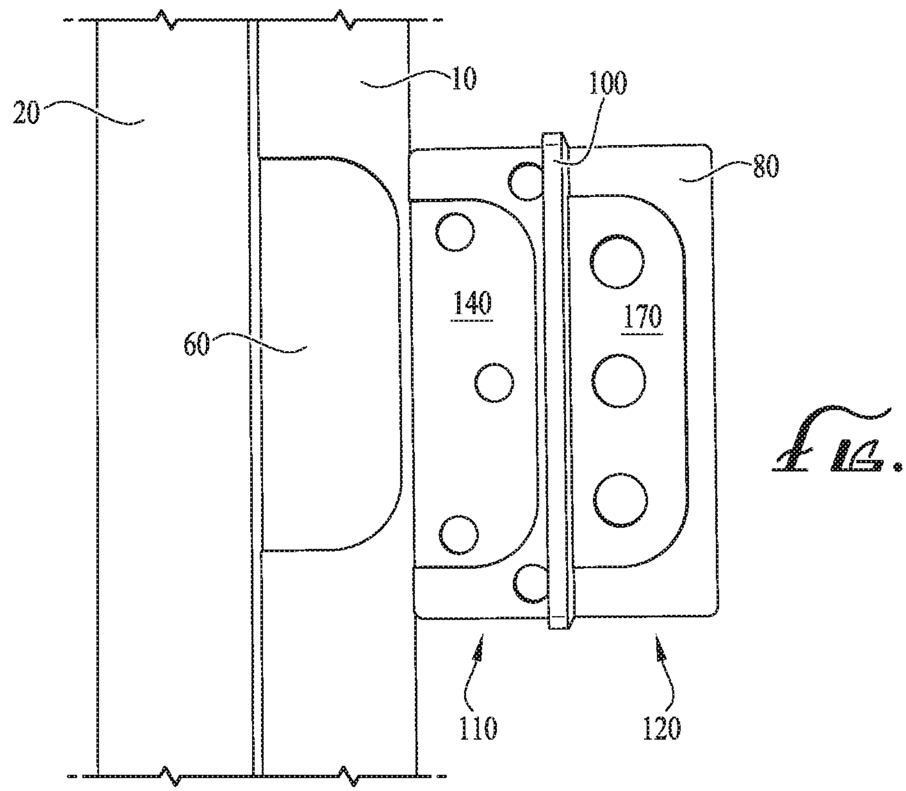
FIGS. 7 and 8 collectively illustrate an example use of the mounting tool of FIGS. 3-6 for locating a mounting position of the door hinges.

FIGS. 7 and 8 illustrate views of the mounting tool 80 in use for locating a mounting position for hinges of the replacement door 20 in accordance with one embodiment. FIG. 7 illustrates the original door 10 and the replacement door 20 in a side-by-side configuration in a similar arrangement as in FIG. 1. With reference to FIG. 7, the original door 10 includes a hinge mortise 60 as described previously with reference to FIG. 1. As mentioned previously, the mounting tool 80 is used to quickly and easily locate the corresponding position of the door hinge 200 for the replacement door 20 without any requirement of elaborate measurements. The following section provides additional details of an example method of using mounting tool 80.

With particular reference to FIG. 7, the doors 10, 20 are arranged next to one another so that their heights are roughly equivalent to each other. Once the doors 10, 20 are properly positioned, a separator device 30 may be used to secure the position of the doors 10, 20. Thereafter, the mounting tool 80 is aligned with the existing hinge mortise 60 of the original door 10. To align the mounting tool 80, the raised region 170 on the second portion 120 of the mounting tool 80 is seated with the existing hinge mortise 60 of the worn door 10. Once properly aligned, the raised region 170 of the mounting tool 80 sits flush within the mortise 60, and at least one of the openings 190 may align with an existing fastener opening (not shown) on the mortise 60. When the mounting tool 80 is properly positioned along the hinge mortise 60, the dividing wall 100 of the mounting tool 80 rests between the doors 10, 20, and the recessed region 140 on the first portion 110 of the mounting tool 80 is positioned over the replacement door 20, leaving a small gap between the mounting tool 80 and the replacement door 20.

With particular reference to FIG. 8, once the mounting tool 80 is properly positioned, the recessed region 140 of the first portion 110 of the mounting tool 80 provides a corresponding location for the door hinge 200. As illustrated in FIG. 6, the first portion 110 of the mounting tool 80 is thicker than the second portion 120 (excluding the raised region 170) and also includes the recessed region 140. Accordingly, there is sufficient space underneath the first portion 110 for inserting the door hinge 200 between the replacement door 20 and the mounting tool 80 as noted previously.

Once the mounting tool 80 is in position, a hinge leaf 210 of the door hinge 200 is inserted into the recessed region 140 and seated flush against the exterior wall 270 such that at least one of the openings 220 (see FIG. 11) of the door hinge 200 is aligned with a corresponding opening 150 formed through the recessed region 140. Once the hinge leaf 210 slides entirely into the recessed region 140 of the mounting tool 80, fasteners 230 may be inserted through the openings 150 of the mounting tool 80 and through the openings 220 of the door hinge 200 to secure the door hinge 200 in position (see FIG. 11) on the replacement door 20. As illustrated in FIG. 11, once the mounting process is complete, the door hinge 200 is aligned in a corresponding position on the replacement door 20 as it was on the original door 10. Once the door hinge 200 is properly secured to the replacement door 20, the mounting tool 80 may be removed and a similar process may be employed to position any remaining door hinges 200 on the replacement door 20.

As described with reference to FIGS. 7-8, the door hinge 200 is fastened directly to the side of the replacement door 20 without use of a mortise. Considering that the door hinge 200 has some thickness, the door hinge 200 does not sit flush relative to the edge or side surface of the replacement door 20 after it is affixed to the replacement door 20. To provide a flush finish, an edge mounting strip 240 having a thickness substantially equal to the thickness of the door hinge 200 is affixed to the side of the replacement door 20 to ensure that the replacement door 20 fits properly once mounted to the door jamb. Additional details and features of the edge mounting strip 240 are provided below with particular reference to FIGS. 9 and 10.

Figure 9:
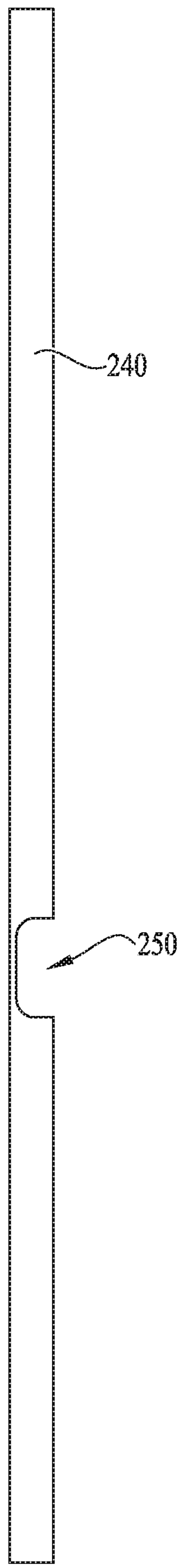
FIGS. 9 and 10 illustrate views of an edge mounting strip that forms a portion of the replacement door assembly in accordance with one embodiment.

FIG. 9 illustrates an example embodiment of an edge mounting strip 240. With reference to FIG. 9, the edge mounting strip 240 is an elongated, thin strip of material preferably may of a wood, wood composite, or other suitable material that is the same or similar to the material of the replacement door 20. The edge mounting strip 240 includes at least one cutout region 250 designed to match a shape of the door hinge leaf shape (e.g., a D-shaped region in this embodiment). In other embodiments, the cutout region 250 may be shaped in other suitable configurations to match various door hinge designs (e.g., squares, rectangles, etc.) as needed. As further discussed in detail below, the cutout region 250 includes an edge profile matching that of the exterior wall 270 of the recessed region 140 so that the door hinge 200 sits flush along the side of the replacement door 20.

In some embodiments, the edge mounting strip 240 includes an adhesive back surface (not shown) to simplify the mounting process. In such embodiments, the edge mounting strip 240 may have a pre-applied adhesive on the back surface and a releasable backing material protecting the adhesive prior to application of the edge mounting strip 240. In such configuration, the releasable backing material may simply be removed prior to installation of the edge mounting strip 240 on the replacement door 20. In other embodiments, the edge mounting strip 240 may not include a pre-applied adhesive, but the adhesive material may be applied prior to installation of the strip 240 on the replacement door 20. In still other embodiments, the edge mounting strip 240 may including mounting openings (not shown) for fastening the strip 240 via fasteners (e.g., nails, screws, or other suitable fasteners) to the replacement door 20. Additional details of example mounting methods of the edge mounting strip 240 are further described with particular reference to FIG. 10.

With reference to FIG. 10, once the door hinge 200 has been partially or entirely coupled to the replacement door 20 in a desired position, the edge mounting strip 240 may be first aligned with the original door 10 such that the cutout region 250 of the edge mounting strip 240 is aligned with the existing hinge mortise 60 of the original door 10. As illustrated in FIG. 10, the edge mounting strip 240 may have a length such that a portion of the edge mounting strip 240 extends beyond a top portion of the original door 10. Once the cutout region 250 is aligned with the hinge mortise 60, the excess length of the edge mounting strip 240 extending beyond the door 10 (and beyond the door 20) may be scored and broken/cut to conform the edge mounting strip 240 to the height of the doors 10, 20. In some embodiments, the lower portion of the edge mounting strip 240 positioned underneath the mortise 60 may also be cut to a predetermined length as desired to provide space for additional edge mounting strips 240 used for any remaining door hinges of the replacement door 20. It should be understood that the edge mounting strip 240 may be similarly aligned with the replacement door 20 instead of the original door 10 and then broken/cut, if desired.

Once the edge mounting strip 240 has been trimmed as desired, the mounting tool 80 may be removed from both doors 10, 20 to accommodate positioning of the edge mounting strip 240 on the replacement door 20. As noted previously, the edge mounting strip 240 may include an adhesive backing surface that may simplify application of the edge mounting strip 240 to the replacement 20. In other embodiments, other suitable attachment methods for the edge mounting strip 240 may also be used. To complete the process, the cutout region 250 of the edge mounting strip 240 is positioned on the replacement door 20 such that it closely aligns with the edges of the hinge leaf 210 of the door hinge 200. Once the edge mounting strip 240 is properly aligned, it can be adhered or otherwise coupled to the replacement door 20. Preferably, the edge mounting strip 240 extends to the top of the replacement door 20, thereby creating a flush exterior finish along the edge of the replacement door 20. As noted previously, a similar process may be performed for each of the door hinges 200. If necessary, the edge mounting strip 240 may be sanded, painted, or otherwise treated, as needed, to provide the desired aesthetic look for the replacement door 20.

As noted in the written description, it should be understood that while the mounting tool 80 and the edge mounting strip 240 are designed for use with doors having a standard D-shaped door hinge 200, a similar arrangement may be used to accommodate any door hinge design without departing from the principles of the disclosed subject matter. For example, if the door hinge 200 included substantially rectangular hinge leaves, the recessed region 140 and the raised region 170 of the mounting tool 80 and the cutout region 250 of the edge mounting strip 240 may be adapted to include a corresponding rectangular arrangement.

It is intended that subject matter disclosed in particular portions herein can be combined with the subject matter of one or more of other portions herein as long as such combinations are not mutually exclusive or inoperable. In addition, many variations, enhancements and modifications of the concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A mounting assembly comprising:
 a mounting tool, including:
  a base having a first surface and an opposite second surface;
  a dividing wall extending upwardly from the first surface of the base, the dividing wall separating the first surface into a first portion and a second portion;
  a recessed region formed at the first portion of the base, the recessed region including a floor and a first exterior wall having a first profile, the exterior wall extending upwardly from the floor to the first surface of the base, wherein the recessed region includes at least one opening extending through the floor to the second surface of the base; and
  a raised region including a second exterior wall extending upwardly from the first surface of the base, the raised region formed at the second portion of the base and including at least one opening extending therethrough to the second surface of the base; and
 an elongated edge strip including a cutout region formed thereon, the cutout region having an edge profile corresponding to the first profile of the first exterior wall of the recessed region.

2. The mounting assembly of claim 1, wherein the recessed region opens at a peripheral side surface of the mounting tool such that the floor is arranged orthogonal to the peripheral side surface.

3. The mounting assembly of claim 1, wherein the second exterior wall of the raised region includes a portion that is adjacent to and abuts a side surface of the dividing wall.

4. The mounting assembly of claim 1, wherein a depth of the recessed region relative to the first surface is equal to a height of the raised region relative to the first surface.

5. The mounting assembly of claim 1, wherein the first exterior wall includes a first curved portion, and the second exterior wall includes a second curved portion, the first and second curved portions being formed with the same radius of curvature.

6. A mounting tool comprising:
 a base having a first surface and an opposite second surface;
 a dividing wall extending upwardly from the first surface of the base, the dividing wall separating the first surface into a first portion and a second portion;
 a recessed region formed at the first portion of the base, the recessed region including a floor and a first exterior wall having a first profile, the exterior wall extending upwardly from the floor to the first surface of the base, wherein the recessed region includes at least one opening extending through the floor to the second surface of the base; and
 a raised region including a second exterior wall extending upwardly from the first surface of the base, the raised region formed at the second portion of the base and including at least one opening extending therethrough to the second surface of the base.

7. The mounting tool of claim 6, wherein the recessed region opens at a peripheral side surface of the mounting tool such that the floor is arranged orthogonal to the peripheral side surface.

8. The mounting tool of claim 6, wherein the second exterior wall of the raised region includes a portion that is adjacent to and abuts a side surface of the dividing wall.

9. The mounting tool of claim 6, wherein a depth of the recessed region relative to the first surface is equal to a height of the raised region relative to the first surface.

10. The mounting tool of claim 6, wherein the first exterior wall includes a first curved portion, and the second exterior wall includes a second curved portion, the first and second curved portions being formed with the same radius of curvature.

11. A method for replacing doors, the method comprising:
 arranging a first door and a second door in a side-by-side configuration;
 inserting a mounting tool between the first and second doors, the mounting tool including a dividing wall positioned between and separating the doors;
 aligning a raised region of the mounting tool with a mortise formed on the first door, the raised region seated within the mortise;
 inserting a door leaf into a recessed portion of the mounting tool;
 coupling the door leaf to the second door; and
 removing the mounting tool to separate the first and second doors.

12. The method of claim 11, wherein the recessed portion of the mounting tool further includes at least one opening extending therethrough, and wherein the step of coupling the door leaf to the second door further includes inserting a fastener through the at least opening of the recessed portion.

13. The method of claim 11, further comprising coupling an elongated edge strip to the second door, the edge strip including a cutout region having an edge profile corresponding to an edge profile of the door leaf, wherein the cutout region surrounds the door leaf when the elongated edge strip is coupled to the second door.

14. The method of claim 13, further comprising treating an exterior surface of the elongated edge strip, wherein the step of treating includes one of painting, staining, or sanding.

15. The method of claim 13, further comprising cutting a portion of the elongated edge strip such that the edge strip extends to and is flush against a top portion of the second door when coupled.

16. The method of claim 13, wherein a thickness of the elongated edge strip corresponds to a thickness of the door leaf such that the elongated edge strips is flush against the door leaf when coupled.

17. The method of claim 11, further comprising inserting a separator device between the first and second doors to secure the doors in the side-by-side configuration.

18. The method of claim 11, wherein the dividing wall extends upwardly from the first surface of a base of the mounting tool, and wherein the dividing wall separates the recessed region and the raised region.

19. The method of claim 18, wherein the recessed region includes a floor and a first exterior wall having a first profile, the exterior wall extending upwardly from the floor to the first surface of the base, and wherein the raised region includes a second exterior wall extending upwardly from the first surface of the base, and wherein a depth of the recessed region relative to the first surface is equal to a height of the raised region relative to the first surface.

20. The method of claim 18, wherein the first exterior wall includes a first curved portion, and the second exterior wall includes a second curved portion, the first and second curved portions being formed with the same radius of curvature.

* * * * *